US010767406B2

(12) United States Patent
Huang et al.

(10) Patent No.: US 10,767,406 B2
(45) Date of Patent: Sep. 8, 2020

(54) HINGE MECHANISM (71) Applicant: Acer Incorporated, New Taipei (TW)

(72) Inventors: Yu-Chin Huang, New Taipei (TW);
Wen-Neng Liao, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/422,984

(22) Filed: May 25, 2019

(65) Prior Publication Data

US 2019/0368251 A1    Dec. 5, 2019

(30) Foreign Application Priority Data

May 30, 2018 (TW) .............................. 107118489 A (51) Int. Cl.
*E05D 15/00* (2006.01)
*E05D 11/10* (2006.01)
(Continued)

(52) U.S. Cl.
CPC ................ *E05D 11/10* (2013.01); *E05D 3/06* (2013.01); *G06F 1/1681* (2013.01); *E05Y 2900/606* (2013.01); *G06F 1/1616* (2013.01)

(58) Field of Classification Search
CPC ...... G06F 1/168; G06F 1/1681; G06F 1/1616; G06F 1/547; E05Y 2900/602;
(Continued)

(56) References Cited

U.S. PATENT DOCUMENTS 3,680,927 A * 8/1972 Neureuther .......... B23Q 11/085
                                                    305/50
8,170,630 B2 * 5/2012 Murayama ............ H04M 1/022
                                                    16/330
(Continued)

FOREIGN PATENT DOCUMENTS

CN          205715242 U      11/2016
CN          107003701 A       8/2017
(Continued)

OTHER PUBLICATIONS

Chinese language office action dated Jan. 25, 2019, issued in application No. TW 107118489.
(Continued)

*Primary Examiner* — Chucky Y Mah
(74) *Attorney, Agent, or Firm* — McClure, Qualey & Rodack, LLP (57) ABSTRACT A hinge mechanism is provided, including a rotary member, a first member, a second member, a first shaft, and a first slider. The first member has a first guiding channel. The second member pivotally connects to the first member and has a first recess. The first shaft pivotally connects the rotary member and the first member, wherein the first shaft has a first cavity. The first slider is movable between the first recess and the first cavity. When the first slider is located in the first recess, the first member is prohibited from rotating relative to the second member by the first slider. When the first slider slides from the first recess along the first guiding channel to the first cavity, the rotary member is prohibited from rotating relative to the first member by the first slider.

13 Claims, 12 Drawing Sheets (51) Int. Cl.
*E05D 3/06* (2006.01)
*G06F 1/16* (2006.01)

(58) Field of Classification Search
CPC ............ E05Y 2900/606; H04M 1/022; H04M 1/0214; H04M 1/0216; E05D 3/12; E05D 3/122; E05D 3/14; E05D 3/16; E05D 3/06; E05D 11/06; E05D 11/10; E05D 7/12
See application file for complete search history.

(56) References Cited

U.S. PATENT DOCUMENTS

| | | | |
|---|---|---|---|
| 9,625,954 B2* | 4/2017 | Campbell | ............. E05D 3/06 |
| 10,174,534 B2 | 1/2019 | Tazbaz et al. | |
| 10,253,804 B2* | 4/2019 | Park | ............. G06F 1/1681 |
| 10,437,293 B2* | 10/2019 | Bitz | ............. G06F 1/1616 |
| 2014/0126133 A1* | 5/2014 | Griffin | ............. G06F 1/1652 |
| | | | 361/679.27 |
| 2014/0196254 A1* | 7/2014 | Song | ............. E05D 3/14 |
| | | | 16/302 |
| 2014/0217875 A1 | 8/2014 | Park et al. | |
| 2016/0132076 A1* | 5/2016 | Bitz | ............. H04M 1/022 |
| | | | 361/679.27 |
| 2016/0147267 A1* | 5/2016 | Campbell | ............. E05D 7/12 |
| | | | 361/679.27 |
| 2016/0266615 A1* | 9/2016 | Uchiyama | ............. G06F 1/1681 |
| 2016/0357226 A1 | 12/2016 | Campbell et al. | |
| 2017/0090523 A1* | 3/2017 | Tazbaz | ............. H04M 1/022 |
| 2018/0067519 A1 | 3/2018 | Tazbaz et al. | |
| 2018/0239401 A1 | 8/2018 | Lin et al. | |

FOREIGN PATENT DOCUMENTS

| | | |
|---|---|---|
| CN | 107209535 A | 9/2017 |
| TW | 201831799 A | 9/2018 |

OTHER PUBLICATIONS

Chinese language office action dated Apr. 28, 2020, issued in application No. CN 201810652124.6.

* cited by examiner

HINGE MECHANISM

CROSS REFERENCE TO RELATED APPLICATIONS

This Application claims priority of Taiwan Patent Application Ser. No. 107118489, filed on May 30, 2018, the entirety of which is incorporated by reference herein.

BACKGROUND OF THE INVENTION

Field of the Invention

The application relates in general to a hinge mechanism, and in particular, to a multi joint hinge mechanism.

Description of the Related Art

Conventional laptop computers usually have a hinge mechanism to pivotally connect the screen with the main body, but the hinge mechanism may have the disadvantage of large dimensions. Moreover, multi joint hinge mechanisms may also be applied in laptop computers. Since multi-joint hinge mechanisms have more than one rotational degree of freedom (DOF), several joints may be active and rotate at the same time, resulting in the unsafe and unstable operation of the hinge mechanism. Therefore, it has become a challenge to design a hinge mechanism that is safe and convenient to use in laptop computers.

BRIEF SUMMARY OF INVENTION

In view of the aforementioned problems, an object of the invention is to provide a hinge mechanism that includes a rotary member, a first member, a second member, a first shaft, and a first slider. The first member has a first guiding channel. The second member pivotally connects to the first member and has a first recess. The first shaft pivotally connects the rotary member and the first member, wherein the first shaft has a first cavity. The first slider is movable between the first recess and the first cavity. When the first slider is located in the first recess, the first member is prohibited from rotating relative to the second member by the first slider. When the first slider slides from the first recess along the first guiding channel to the first cavity, the rotary member is prohibited from rotating relative to the first member by the first slider.

In some embodiments, when the first slider is located in the first recess and the rotary member is pushed by an external force, the rotary member rotates a first angle relative to the first member about the central axis of the first shaft.

In some embodiments, the first member has a first restricting portion, and when the rotary member rotates the first angle relative to the first member, the first restricting portion contacts the rotary member to restrict the rotary member at the first angle.

In some embodiments, the hinge mechanism further includes a second shaft pivotally connecting the first and second members, wherein when the rotary member rotates the first angle relative to the first member, the external force applies torque about the central axis of the second shaft and pushes the first slider to move from the first recess along the first guiding channel to the first cavity.

In some embodiments, the second member has a second restricting portion, and when the first member rotates a second angle relative to the second member, the second restricting portion contacts the first member to restrict the first member at the second angle.

In some embodiments, the second member has a second guiding channel, and the second shaft has a second cavity, wherein the hinge mechanism further comprises a third member and a second slider. The third member pivotally connects to the second member and having a second recess. The second slider is movable between the second recess and the second cavity. When the second slider is located in the second recess, the second member is prohibited from rotating relative to the third member by the second slider. When the second slider slides from the second recess along the second guiding channel to the second cavity, the first member is prohibited from rotating relative to the second member by the second slider.

In some embodiments, when the first member rotates the second angle relative to the second member, an end of the second slider faces the second cavity.

In some embodiments, the third member has a third restricting portion, and when the second member rotates a third angle relative to the third member, the second slider is located in the second cavity, and the third restricting portion contacts the second member to restrict the second member at the third angle.

In some embodiments, the hinge mechanism further includes a third shaft pivotally connecting the second and third members, wherein when the second member rotates the third angle relative to the third member, the external force applies torque about the central axis of the third shaft and pushes the second slider to move from the second recess along the second guiding channel to the second cavity.

In some embodiments, the third member has a third guiding channel, and the third shaft has a third cavity, wherein the hinge mechanism further comprises a fourth member and a third slider. The fourth member pivotally connects to the third member and has a third recess. The third slider is movable between the third recess and the third cavity. When the third slider is located in the third recess, the third member is prohibited from rotating relative to the fourth member by the third slider. When the third slider slides from the third recess along the third guiding channel to the third cavity, the second member is prohibited from rotating relative to the third member by the third slider.

In some embodiments, when the second member rotates the third angle relative to the third member, an end of the third slider faces the third cavity.

In some embodiments, the fourth member has a fourth restricting portion, and when the third member rotates a fourth angle relative to the fourth member, the third slider is located in the third cavity, and the fourth restricting portion contacts the third member to restrict the third member at the fourth angle.

In some embodiments, the hinge mechanism further includes a fourth shaft pivotally connecting the third and fourth members, wherein when the second member rotates the third angle relative to the third member, the external force applies torque about the central axis of the fourth shaft and pushes the third slider to move from the third recess along the third guiding channel to the third cavity.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the hinge mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
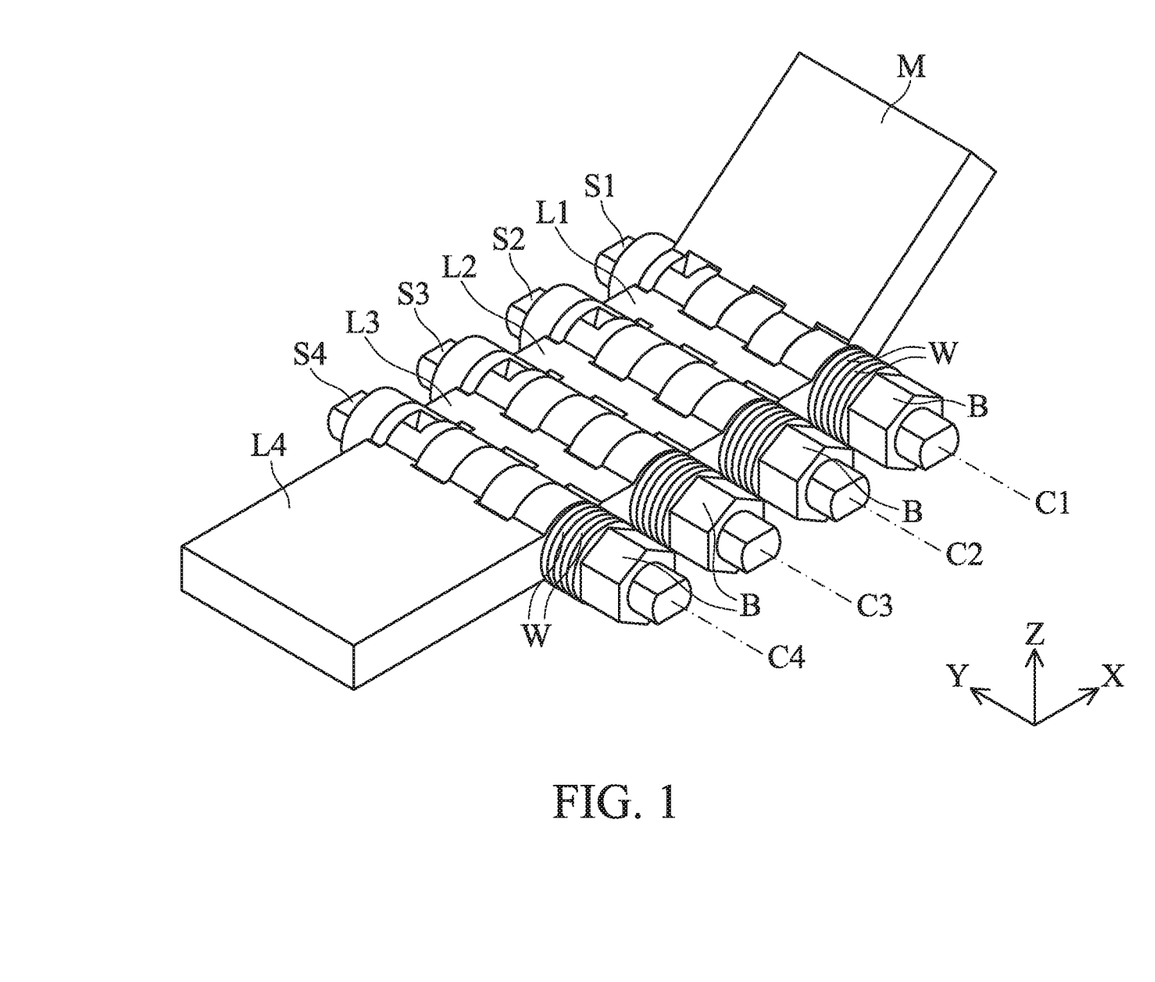
FIG. 1 shows a perspective diagram of a hinge mechanism in accordance with an embodiment of the invention.
Figure 2:
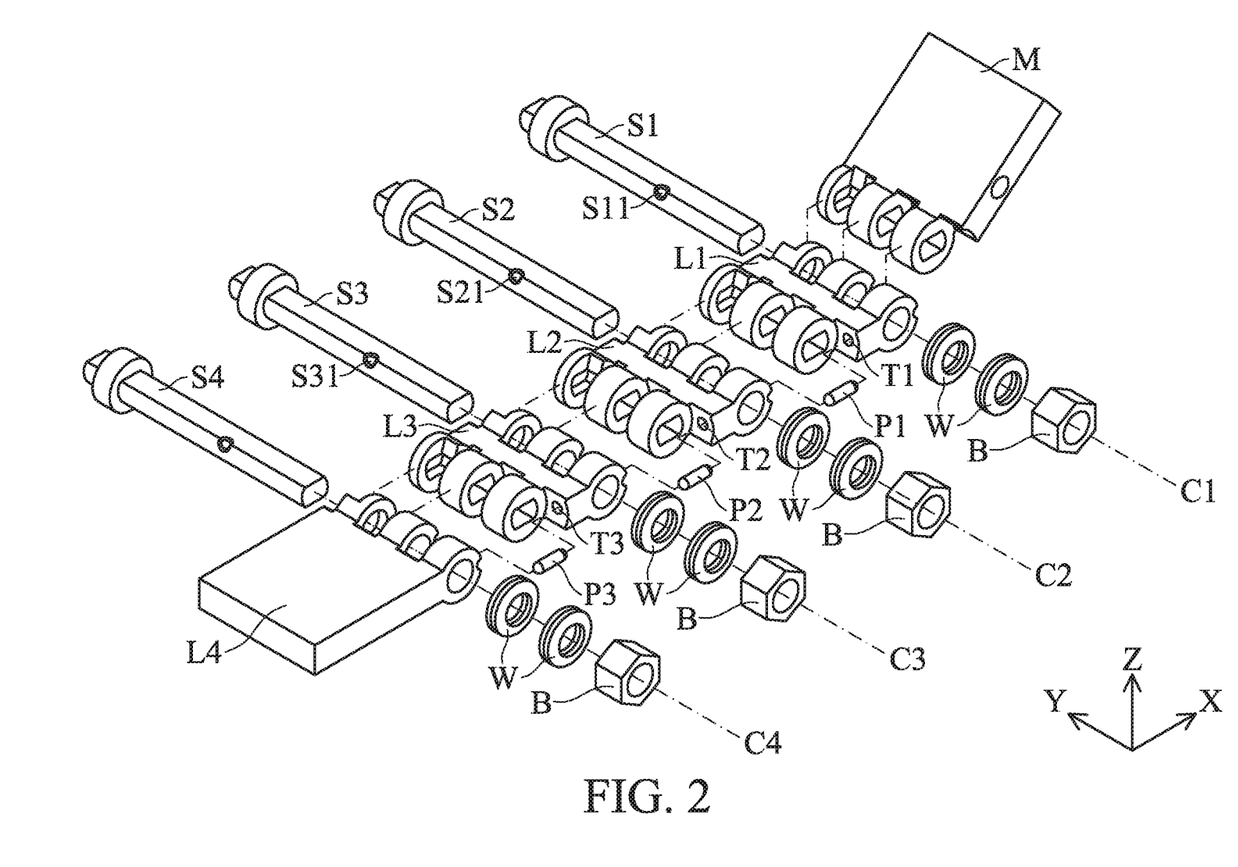
FIG. 2 shows an exploded view of the hinge mechanism in FIG. 1.

FIG. 1 shows a perspective diagram of a hinge mechanism in accordance with an embodiment of the invention, and FIG. 2 shows an exploded view of the hinge mechanism in FIG. 1. Referring to FIGS. 1 and 2, the hinge mechanism in this embodiment may be disposed in a laptop computer, primarily including a rotary member M, a first member L1, a second member L2, a third member L3, and a fourth member L4. The rotary member M and the first, second, third, and fourth members L1-L4 are pivotally connected to each other by the first, second, third, and fourth shafts S1-S4, so as to form a multi joint hinge mechanism.

During assembly, the first shaft S1 is disposed through the rotary member M and the first member L1, so that the rotary member M is rotatable relative to the first member L1 around the central axis C1 of the first shaft S1. Similarly, the second shaft S2 is disposed through the first and second members L1 and L2, so that the first member L1 is rotatable relative to the second member L2 around the central axis C2 of the second shaft S2. The third shaft S3 is disposed through the second and third members L2 and L3, so that the second member L2 is rotatable relative to the third member L3 around the central axis C3 of the third shaft S3. The fourth shaft S4 is disposed through the third and fourth members L3 and L4, so that the third member L3 is rotatable relative to the fourth member L4 around the central axis C4 of the fourth shaft S4.

As shown in FIGS. 1 and 2, several torque resistance elements W and securing members B are disposed on a side of the first, second, third, and fourth shafts S1-S4. The torque resistance elements W may be spring sheets, metal washers, or other frictional elements that provide appropriate torque resistance during the rotation of the hinge mechanism. The securing members B may be nuts to restrict the torque resistance elements S in predetermined positions on the first, second, third, and fourth shafts S1-S4.

In some embodiments, the rotary member M may be mounted to the display unit of a laptop computer, and the fourth member L4 may be mounted to the input unit of the laptop computer, so that the display and input units are pivotally connected by the hinge mechanism as shown in FIGS. 1 and 2. It should be noted that the hinge mechanism in this embodiment further includes a first slider P1, a second slider P2, and a third slider P3, wherein the first slider P1 is movably disposed in a first guiding channel T1 of the first member L1, the second slider P2 is movably disposed in a second guiding channel T2 of the second member L2, and the third slider P3 is movably disposed in a third guiding channel T3 of the third member L3. The details of the hinge mechanism and the sliders P1-P3 are described below.

Figure 3:
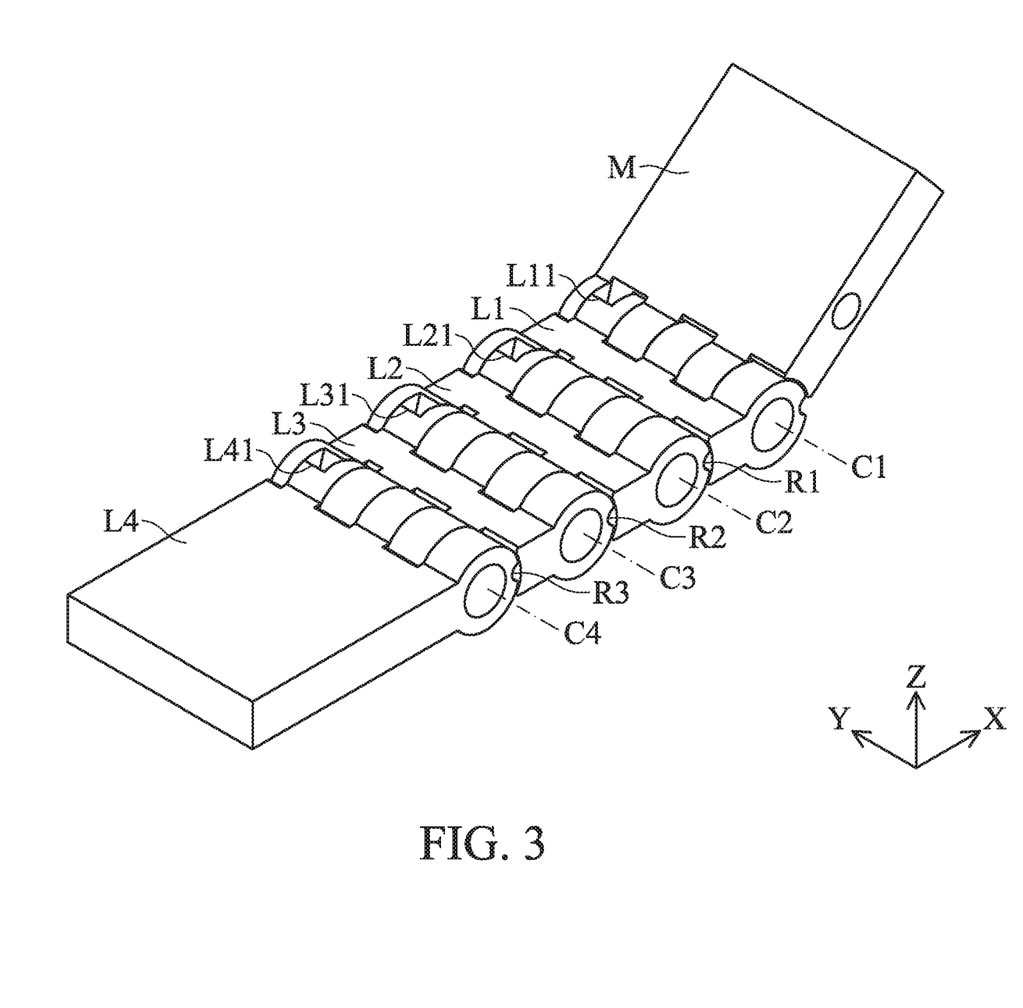
FIG. 3 shows a perspective diagram of the rotary member M and the first, second, third, and fourth members L1-L4 connected to each other.
Figure 4:
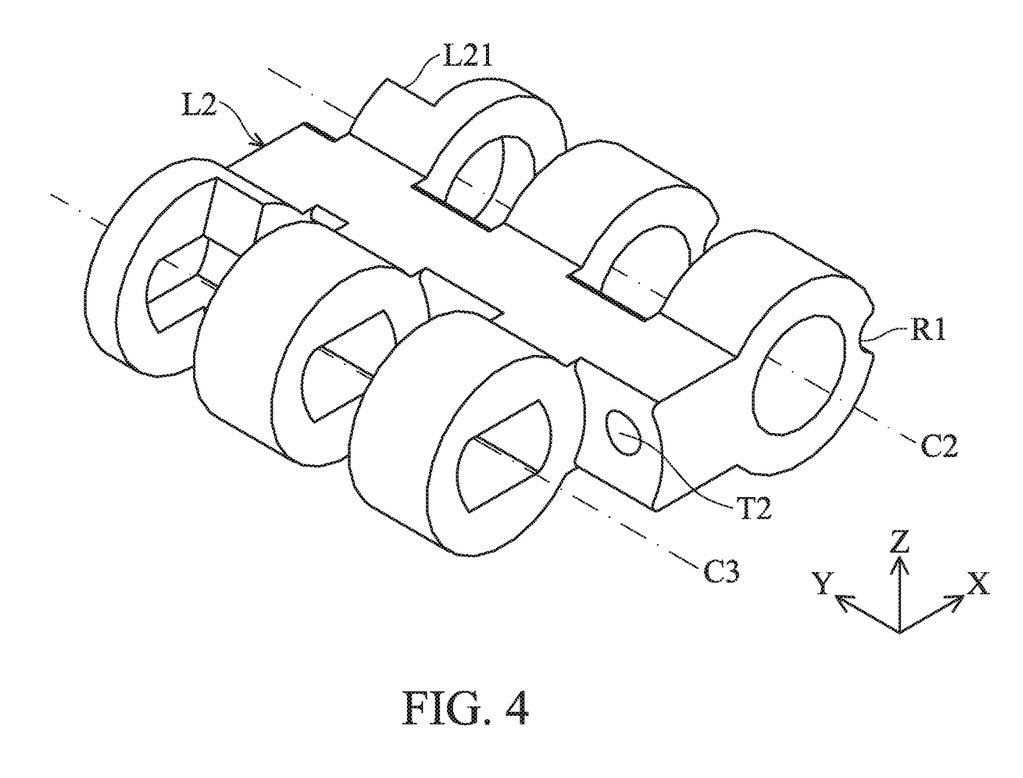
FIG. 4 shows a perspective diagram of the second member L2 in FIG. 3.

FIG. 3 shows a perspective diagram of the rotary member M and the first, second, third, and fourth members L1-L4 connected to each other, and FIG. 4 shows a perspective diagram of the second member L2 in FIG. 3. Referring to FIG. 3, the first, second, third, and fourth members L1-L4 respectively have a first, second, third, and fourth restricting portion L11, L21, L31, and L41 to restrict relative rotation between adjacent members within a specific range. As shown in FIGS. 1-4, the first, second and third members L1-L3 have substantially the same structure, wherein the second member L2 has a first recess R1, the third member L3 has a second recess R2, and the fourth member L4 has a third recess R3. Specifically, the first, second, and third shafts S1-S3 respectively form first, second, and third cavities S11, S21, and S31, corresponding to the first, second, and third recesses R1-R3.

Figure 5:
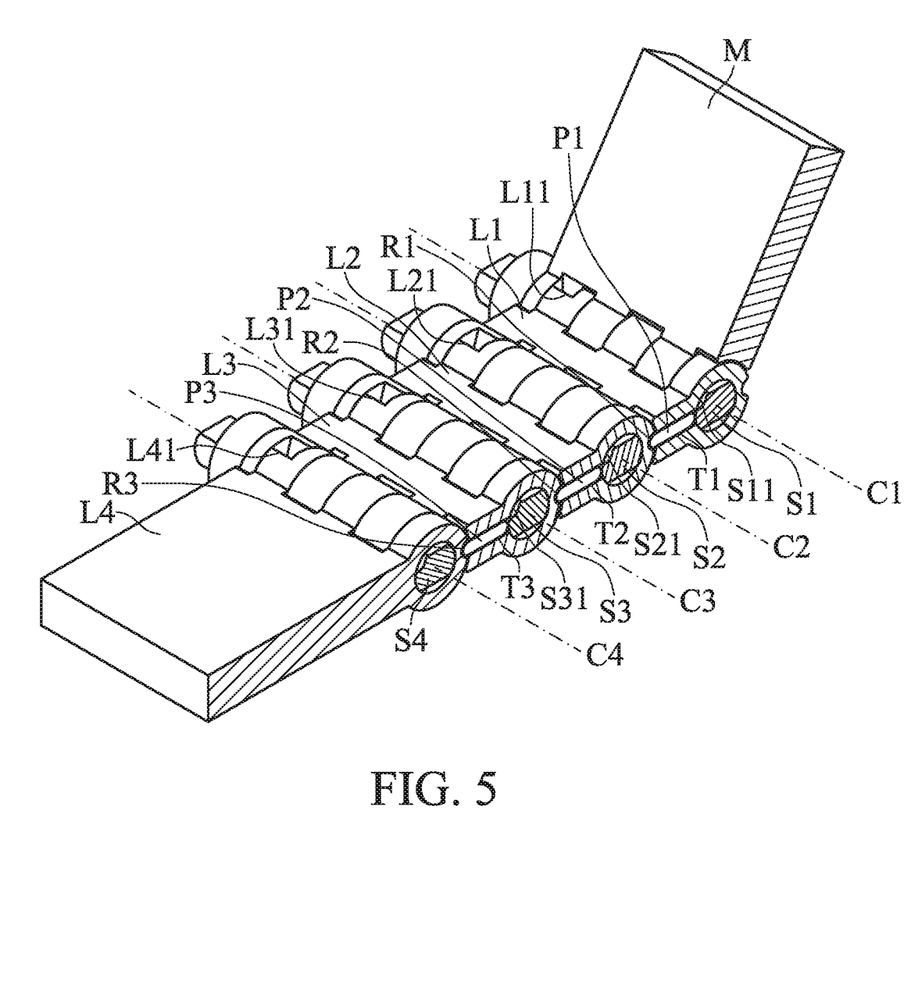
FIG. 5 shows a cross-sectional view of the hinge mechanism when in an initial state.

FIG. 5 shows a cross-sectional view of the hinge mechanism when in an initial state. Referring to FIG. 5, when the hinge mechanism is in an initial state, the left ends of the first, second, and third sliders P1-P3 are respectively joined in the first, second, and third recesses R1-R3 of the second, third, and fourth members L2-L4. Additionally, the right ends of the first, second, and third sliders P1-P3 respectively abuts the outer surfaces first, second, and third shafts S1-S3. In this state, the first, second, third, and fourth members L1-L4 cannot rotate with respect to each other owing to the first, second, and third sliders P1-P3 joined in the recesses R1-R3, and only the rotary member M is allowed to rotate relative to the first member L1.

Figure 6:
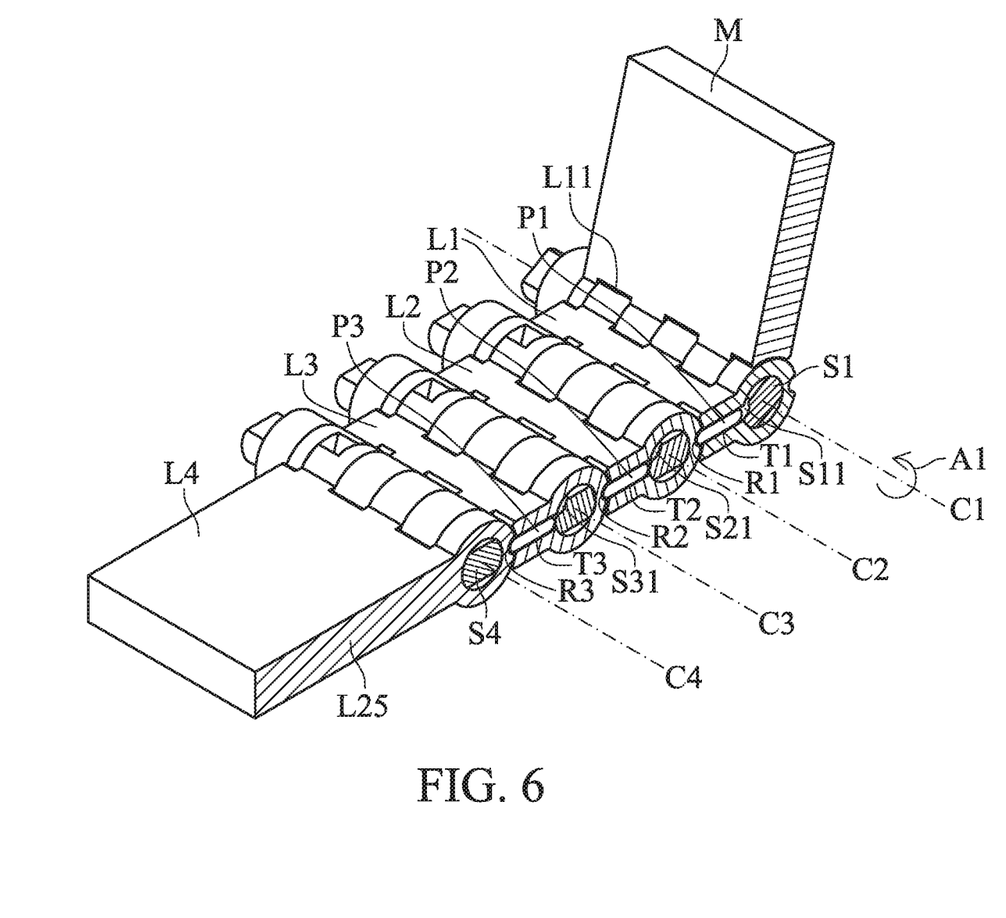
FIG. 6 shows a cross-sectional view of the hinge mechanism when the rotary member M is pushed by an external force and rotates a first angle relative to the first member L1.

FIG. 6 shows a cross-sectional view of the hinge mechanism when the rotary member M is pushed by an external force and rotates a first angle relative to the first member L1. Referring to FIG. 6, when the rotary member M is pushed by an external force to rotate a first angle relative to the first member L1 around the central axis C1 (as the arrow A1 indicates in FIG. 6), the first shaft S1 is rotated along with the rotary member M so that the right end of the first slider P1 faces the cavity S11 of the first shaft S1. In this state, the first restricting portions L11 contacts the rotary member M, so as to restrict the rotary member M at the first angle and ensure that the right end of the first slider P1 is oriented toward the first cavity S11 of the first shaft S1.

Figure 7:
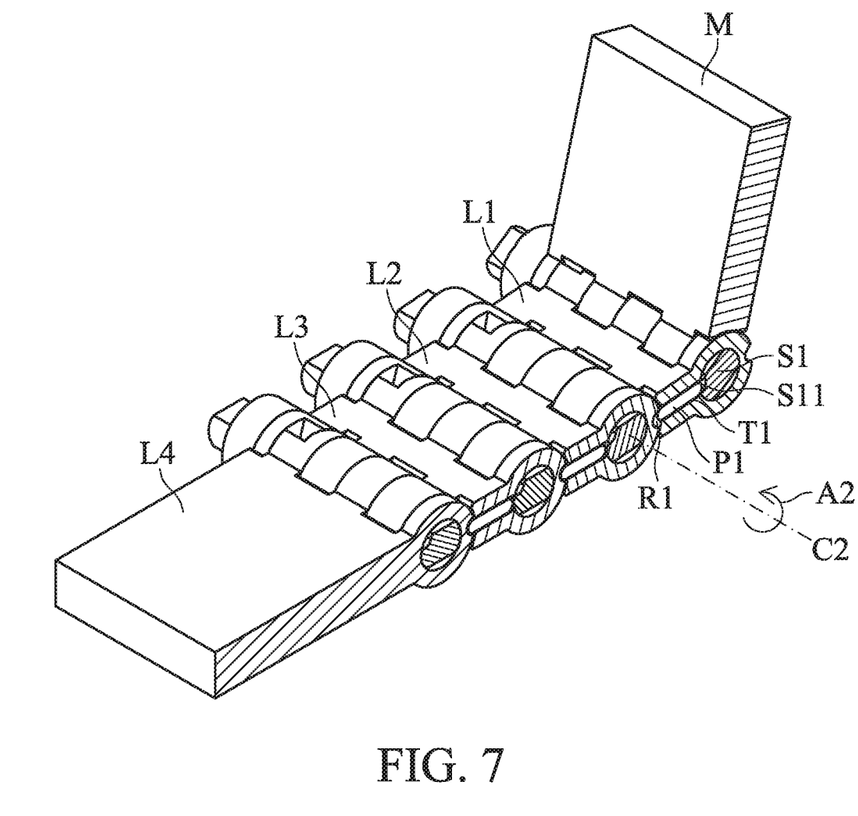
FIG. 7 shows a cross-sectional view of the hinge mechanism when the rotary member M is further pushed by the external force from the state of FIG. 6 to enable the first member L1 to rotate relative to the second member L2.

FIG. 7 shows a cross-sectional view of the hinge mechanism when the rotary member M is further pushed by the external force from the state of FIG. 6 to enable the first member L1 to rotate relative to the second member L2. Referring to FIG. 7, when the rotary member M is continuously pushed by the external force from the state of FIG. 6, the external force applies a torque about the central axis C2 of the second shaft S2, and the first slider P1 is pushed to slide from the first recess R1 through the first guiding channel T1 to the first cavity S11. In this state, since the first slider P1 is forced by the torque to release from the first recess R1, the first member L1 is enabled to rotate relative to the second member L2 (as the arrow A2 indicates in FIG. 7).

Figure 8:
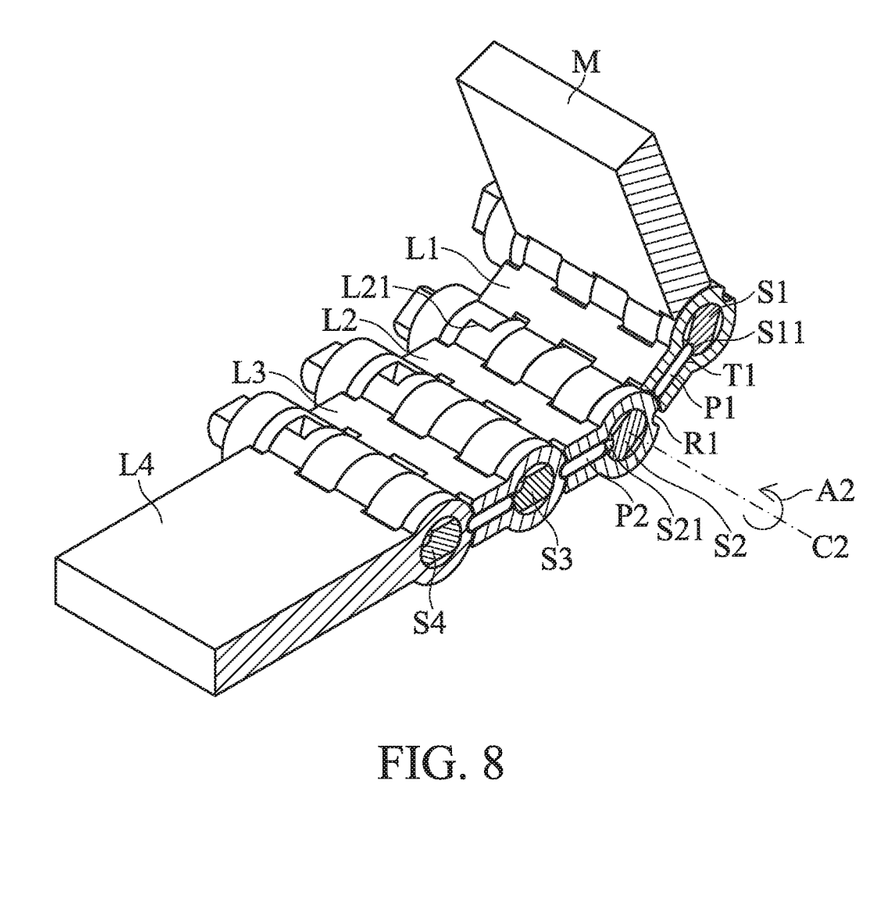
FIG. 8 shows a cross-sectional view of the hinge mechanism when the first member L1 rotates a second angle relative to the second member L2 from the state of FIG. 7.

FIG. 8 shows a cross-sectional view of the hinge mechanism when the first member L1 rotates relative to the second member L2 from the state of FIG. 7. Referring to FIG. 8, with the rotary member M continuously pushed by the external force, the first member L1 can rotate a second angle relative to the second member L2 from the state of FIG. 7, wherein the second shaft S2 is rotated along with the first member L1 relative to the second member S2, so that the right end of the second slider S2 faces the second cavity S21 of the second shaft S2.

In this state, the second restricting portions L21 of the second member L2 contacts the first member L1, so as to restrict the first member L1 at a second angle and ensure that the right end of the first slider P1 is oriented toward the second cavity S21 of the second shaft S2. Moreover, since the first slider P1 has slid into the first cavity S11, the rotation of the rotary member M relative to the first member L1 can be prohibited.

Figure 9:
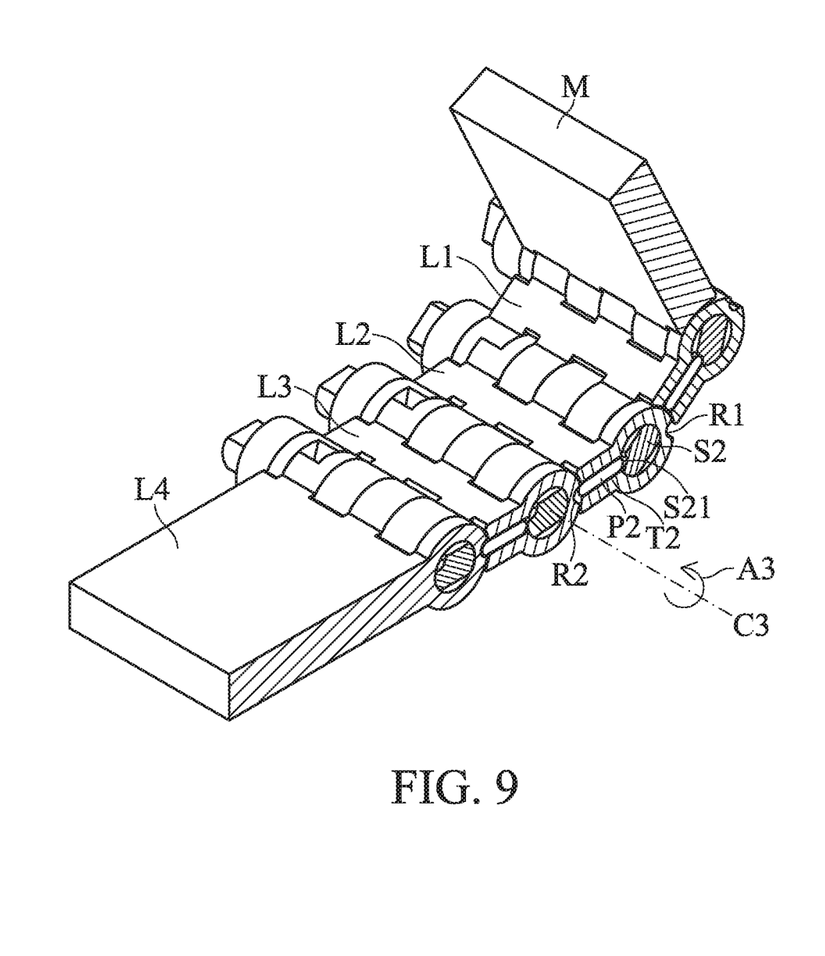
FIG. 9 shows a cross-sectional view of the hinge mechanism when further pushed by the external force from the state of FIG. 8 to enable the second member L2 to rotate relative to the third member L3.

Referring to FIG. 9, when the hinge mechanism is further pushed by the external force from the state of FIG. 8, the external force applies a torque about the central axis C3 of the third shaft S3, and the second slider P2 is forced to slide from the second recess R2 along the second guiding channel T2 to the second cavity S21. In this state, since the second slider P2 is forced by the torque to release from the second recess R2, the second member L2 is enabled to rotate relative to the third member L3 (as the arrow A3 indicates in FIG. 9).

Figure 10:
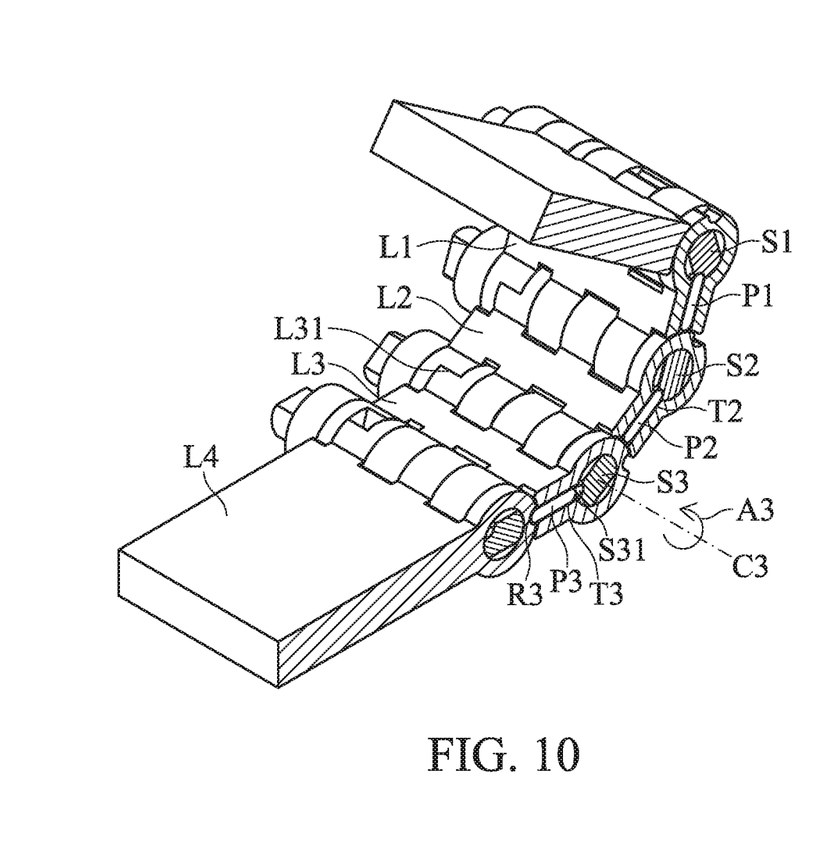
FIG. 10 shows a cross-sectional view of the hinge mechanism when the second member L2 rotates a third angle relative to the third member L3 from the state of FIG. 9.

Referring to FIG. 10, with the hinge mechanism being continuously pushed by the external force, the second member L2 can rotate a third angle relative to the third member L3 from the state of FIG. 9, wherein the third shaft S3 is rotated along with the second member L2 relative to the third member L3, so that the right end of the third slider P3 faces the third cavity S31 of the third shaft S3.

In this state, the third restricting portions L31 of the third member L3 contacts the second member L2 to restrict the second member L2 at the third angle and ensure that the right end of the third slider P3 is oriented toward the third cavity S31 of the second shaft S3. Moreover, since the second slider P2 has slid into the second cavity S21, the rotation of the first member L1 relative to the second member L2 can be prohibited.

Figure 11:
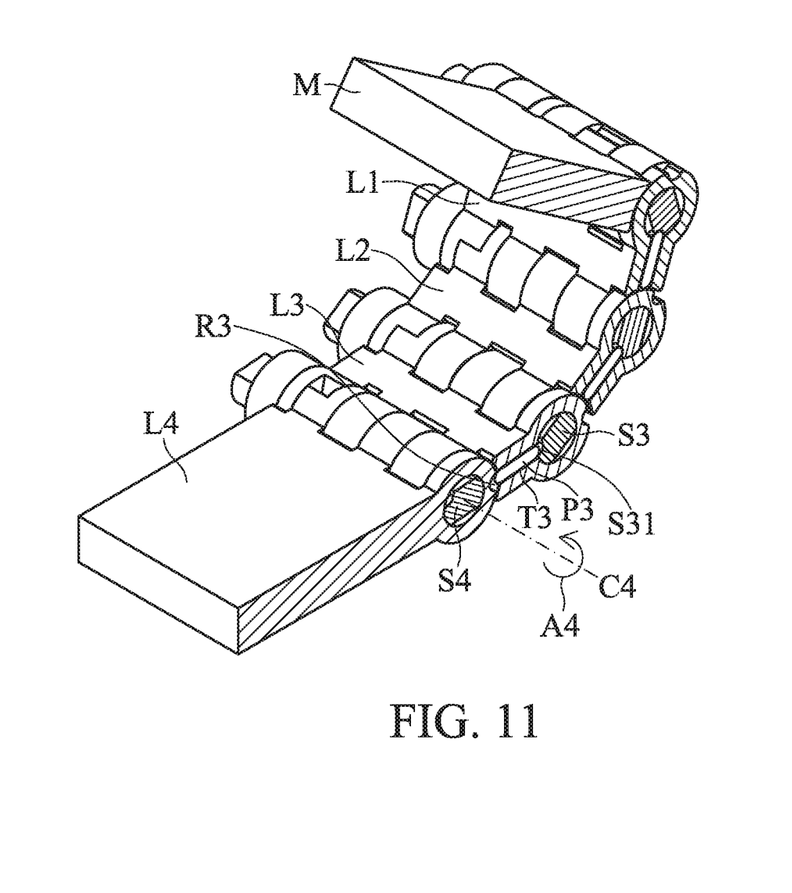
FIG. 11 shows a cross-sectional view of the hinge mechanism when further pushed by the external force from the state of FIG. 10 to enable the third member L3 to rotate relative to the fourth member L4.

Referring to FIG. 11, when the hinge mechanism is further pushed by the external force from the state of FIG. 10, the external force applies a torque about the central axis C4 of the fourth shaft S4, so that the third slider P3 is forced to slide from the third recess R3 along the third guiding channel T3 to the third cavity S31. In this state, the third slider P3 is forced by the torque to detach from the third recess R3, so that the third member L3 is enabled to rotate relative to the fourth member L4 (as the arrow A4 indicates in FIG. 11).

Figure 12:
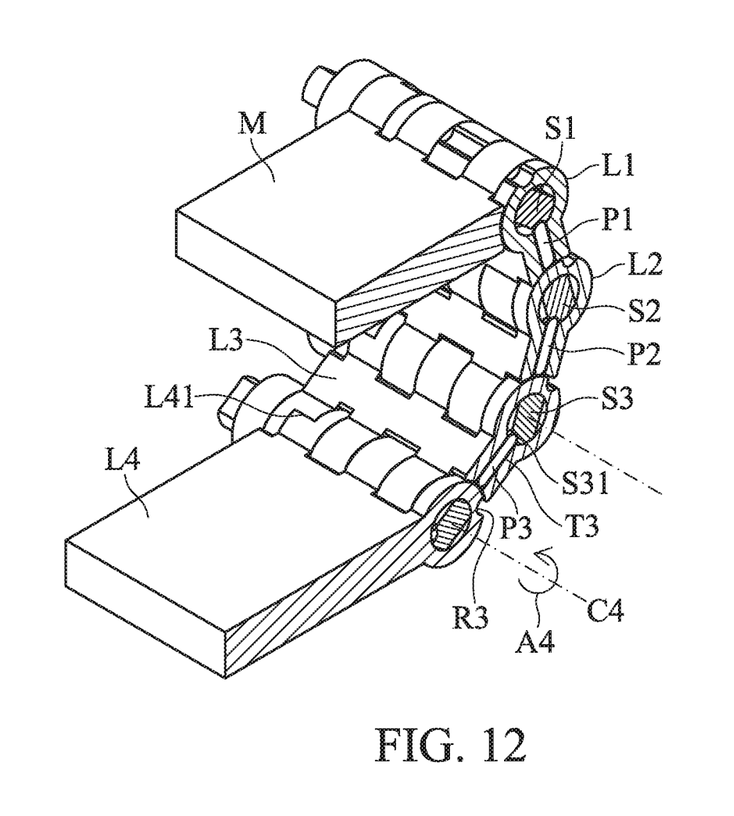
FIG. 12 shows a cross-sectional view of the hinge mechanism when the third member L3 rotates a fourth angle relative to the fourth member L4 from the state of FIG. 11.

As shown in FIG. 12, with the hinge mechanism continuously pushed by the external force, the third member L3 rotates a fourth angle relative to the fourth member L4 from the state of FIG. 11. In this state, the fourth restricting portion L41 of the fourth member L4 contacts the third member L3 to restrict the third member L3 at the fourth angle, and the third slider P3 slides into the third cavity S31 to prohibit the rotation of the second member L2 relative to the third member L3.

Still referring to FIG. 12, the rotary member M has rotated an angle relative to the fourth member L4 equal to the sum of the first, second, third, and fourth angles. Here, the rotary member M and the fourth member L4 are folded and substantially parallel to each other (e.g. the folded state of a laptop computer). To unfold the hinge mechanism to the initial state, the users only need to exert an opposite force on the rotary member M, and the hinge mechanism can be easily transferred from the folded state of FIG. 12 to the initial state of FIG. 5.

It should be noted that the hinge mechanism has only one rotational degree of freedom (DOF) at the same time by applying the movable sliders inside the hinge mechanism, wherein the numbers of the sliders and the members pivotally connected to each other can be adjusted on demands. In some embodiments, the hinge mechanism may include only the rotary member M, the first and second members L1 and L2, the first and second shafts S1 and S2, the first slider P1, and the corresponding torque resistance elements W and securing member B, thereby constituting a dual joint hinge mechanism.

In summary, the invention provides a multi joint hinge mechanism that includes at least a slider inside the hinge mechanism, so that the hinge mechanism has only one rotational degree of freedom (DOF) at the same time. Hence, unsafe and unstable operation of the hinge mechanism when several joints are enabled at the same time can be efficiently avoided. Additionally, since the siders can be directly disposed and concealed inside the hinge mechanism, aesthetic appearance, easy assembly, and miniaturization of the product can also be achieved.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A hinge mechanism, comprising:
a rotary member;
a first member, having a first guiding channel;
a second member, pivotally connected to the first member and having a first recess;
a first shaft, pivotally connecting the rotary member and the first member, wherein the first shaft has a first cavity; and
a first slider, movable between the first recess and the first cavity, wherein when the first slider is located in the first recess, the first member is prohibited from rotating relative to the second member by the first slider, and when the first slider slides from the first recess along the first guiding channel to the first cavity, the rotary member is prohibited from rotating relative to the first member by the first slider.

2. The hinge mechanism as claimed in claim 1, wherein when the first slider is located in the first recess and the rotary member is pushed by an external force, the rotary member rotates a first angle relative to the first member about a central axis of the first shaft.

3. The hinge mechanism as claimed in claim 2, wherein the first member has a first restricting portion, and when the rotary member rotates the first angle relative to the first member, the first restricting portion contacts the rotary member to restrict the rotary member at the first angle.

4. The hinge mechanism as claimed in claim 3, further comprising a second shaft pivotally connecting the first and second members, wherein when the rotary member rotates the first angle relative to the first member, the external force applies torque about the central axis of the second shaft and pushes the first slider to move from the first recess along the first guiding channel to the first cavity.

5. The hinge mechanism as claimed in claim 4, wherein the second member has a second restricting portion, and when the first member rotates a second angle relative to the second member, the second restricting portion contacts the first member to restrict the first member at the second angle.

6. The hinge mechanism as claimed in claim 5, wherein the second member has a second guiding channel, and the second shaft has a second cavity, wherein the hinge mechanism further comprises:
a third member, pivotally connected to the second member and having a second recess; and
a second slider, movable between the second recess and the second cavity, wherein when the second slider is located in the second recess, the second member is prohibited from rotating relative to the third member by the second slider, and when the second slider slides from the second recess along the second guiding channel to the second cavity, the first member is prohibited from rotating relative to the second member by the second slider.

7. The hinge mechanism as claimed in claim 6, wherein when the first member rotates the second angle relative to the second member, an end of the second slider faces the second cavity.

8. The hinge mechanism as claimed in claim 7, wherein the third member has a third restricting portion, and when the second member rotates a third angle relative to the third member, the second slider is located in the second cavity, and the third restricting portion contacts the second member to restrict the second member at the third angle.

9. The hinge mechanism as claimed in claim 8, further comprising a third shaft pivotally connecting the second and third members, wherein when the second member rotates the third angle relative to the third member, the external force applies torque about the central axis of the third shaft and pushes the second slider to move from the second recess along the second guiding channel to the second cavity.

10. The hinge mechanism as claimed in claim 9, wherein the third member has a third guiding channel, and the third shaft has a third cavity, wherein the hinge mechanism further comprises:
a fourth member, pivotally connected to the third member and having a third recess; and
a third slider, movable between the third recess and the third cavity, wherein when the third slider is located in the third recess, the third member is prohibited from rotating relative to the fourth member by the third slider, and when the third slider slides from the third recess along the third guiding channel to the third cavity, the second member is prohibited from rotating relative to the third member by the third slider.

11. The hinge mechanism as claimed in claim 10, wherein when the second member rotates the third angle relative to the third member, an end of the third slider faces the third cavity.

12. The hinge mechanism as claimed in claim 11, wherein the fourth member has a fourth restricting portion, and when the third member rotates a fourth angle relative to the fourth member, the third slider is located in the third cavity, and the fourth restricting portion contacts the third member to restrict the third member at the fourth angle.

13. The hinge mechanism as claimed in claim 12, further comprising a fourth shaft pivotally connecting the third and fourth members, wherein when the second member rotates the third angle relative to the third member, the external force applies torque about the central axis of the fourth shaft and pushes the third slider to move from the third recess along the third guiding channel to the third cavity.

* * * * *